United States Patent
Lu et al.

(10) Patent No.: US 7,127,730 B2
(45) Date of Patent: Oct. 24, 2006

(54) OPTICAL PICKUP HEAD ADJUSTING MECHANISM FOR OPTICAL DISC DRIVE

(75) Inventors: Yi-Wei Lu, Junghe (TW); Hung-Ming Hsieh, Taichung (TW)

(73) Assignee: Micro-Star Int'l Co., Ltd., Taipei Hsien (TW)

( * ) Notice: Subject to any disclaimer, the term of this patent is extended or adjusted under 35 U.S.C. 154(b) by 0 days.

(21) Appl. No.: 10/351,364

(22) Filed: Jan. 27, 2003

(65) Prior Publication Data
US 2004/0205793 A1    Oct. 14, 2004

(51) Int. Cl.
*G11B 7/085*     (2006.01)
*G11B 7/09*      (2006.01)
*G11B 7/08*      (2006.01)

(52) U.S. Cl. .................................. 720/675
(58) Field of Classification Search ............ 720/675, 720/674
See application file for complete search history.

(56) References Cited

U.S. PATENT DOCUMENTS

| | | | | |
|---|---|---|---|---|
| 5,764,618 A | * | 6/1998 | Kim | 720/675 |
| 5,768,248 A | * | 6/1998 | Lee | 720/675 |
| 5,995,478 A | * | 11/1999 | Park | 720/675 |
| 6,044,057 A | * | 3/2000 | Park et al. | 720/675 |
| 6,449,230 B1 | * | 9/2002 | Seto | 369/53.19 |
| 6,704,270 B1 | * | 3/2004 | Moriyama | 720/675 |
| 2001/0012261 A1 | * | 8/2001 | Kim et al. | 369/219 |
| 2001/0022772 A1 | * | 9/2001 | Moriyama | 369/249 |
| 2004/0062185 A1 | * | 4/2004 | Maeda | 369/249 |

FOREIGN PATENT DOCUMENTS

| | | | |
|---|---|---|---|
| JP | 10105982 A | * | 4/1998 |
| JP | 2001014686 A | * | 1/2001 |
| JP | 2001307436 A | * | 11/2001 |
| JP | 2002304743 A | * | 10/2002 |

OTHER PUBLICATIONS

Machine-Translated Copy (in English) of JP 2001-307436 A.*

* cited by examiner

*Primary Examiner*—William J. Klimowicz
(74) *Attorney, Agent, or Firm*—Winston Hsu

(57) ABSTRACT

An adjusting mechanism for an optical pickup head has a cam-shaped adjusting base used to optimally adjust the inclination of optical pickup head. The cam-shaped adjusting base is formed by plastics injection molding in a manner so as to be directly connected to the chassis, which simplifies the assembly process and reduces the production cost.

6 Claims, 7 Drawing Sheets

OPTICAL PICKUP HEAD ADJUSTING MECHANISM FOR OPTICAL DISC DRIVE

BACKGROUND OF THE INVENTION

1. Field of the Invention

The invention relates to an optical disc drive and, more particularly, an adjusting mechanism comprising a cam-shaped adjusting base used to adjust the inclination of the optical pickup head of the optical disc drive.

2. Description of the Related Art

In an optical disc drive, an inclination between an optical pickup head 5 and an optical disc 7 usually causes a non-perpendicularity of the laser beam relative to the optical disc 7. If this inclination is excessive, it affects the correctness of the reading/writing operation on the optical disc, and more particularly digital audio-video optical discs for which the exactness is even stricter. Therefore, an adjusting mechanism is conventionally needed to adjust adequately this inclination to within an acceptable range.

As illustrated in FIG. 1 through FIG. 3, the adjusting mechanism as known in the art may be mounted on a principal guide rod 8 and a secondary guide rod 9 of the optical disc drive. The optical disc drive usually comprises a chassis 3 that supports an optical pickup head 5 for reading and writing data from an optical disc 7. A principal guide rod 8 and a secondary guide rod 9 are mounted parallel to each other on the chassis 3. The principal guide rod 8 and secondary guide rod 9 respectively lie along a lengthwise direction of the chassis 3. An end of the principal guide rod 8 is assembled with an attachment device 10 that comprises a fixing screw 11 an adjusting screw 12, a pressing plate 13, a spring 14 and an attachment base 15. One end of the principal guide rod 8 and two ends of the secondary guide rod 9 are respectively mounted between a pressing plate 13 and a spring 14 of one attachment device 10. The optical pickup head 5 is slidably mounted on the principal guide rod 8 and secondary guide rod 9 along which it is slidably driven by means of a driving motor 16a for performing reading/writing operation on the disc 7 placed on the spindle motor 16.

As illustrated in FIG. 3, the fixing screw 11, the adjusting screw 12, the pressing plate 13, the spring 14 and the attachment base 15 also conventionally form the adjusting mechanism. Each spring 14 is placed below a rod end for pushing upward the corresponding rod end. The attachment base 15 is fixedly attached via the fixing screw 11. The adjusting screw 12 engages through a pressing plate 13 over each corresponding rod end. Via the rotation of the adjusting screws 12, the respective inclination of the principal and secondary guide rods 8, 9 can be adjusted to obtain an adequate inclination of the optical pickup head 5.

However, a disadvantage of the above conventional structure is that the setting of an initial position before adjustment is not easily achieved. The adjustment therefore is too often performed blindly without any reference point. Furthermore, the amount of elements needed in the above adjusting mechanism is excessive and the assembly is relatively complex, which increase the production cost.

SUMMARY OF THE INVENTION

It is therefore a principal object of the invention to provide an adjusting mechanism for an optical pickup head of an optical disc drive that can reduce the number of assembly elements, and simplify the assembly process.

It is another object of the invention to provide an adjusting mechanism for an optical pickup head of an optical disc drive that allows an optimal and accurate adjustment of the inclination of the optical pickup head.

To accomplish the above and other objectives, an adjusting mechanism of the invention comprises a cam-shaped adjusting base and a guide rod abutting member. The adjusting base has a helical and oblique surface below which is connected a rotating part. The adjusting base is mounted below at least a rod end of a principal/secondary guide rod to which is slidably mounted the optical pickup head, with the helical and oblique surface being placed in contact with the rod end. A reference mark is formed on a peripheral portion of the rotating part by plastics injection molding in a manner so as to be directly connected with the chassis. A reference point is further provided on the chassis in an adequate location corresponding to the reference mark for positioning reference. An end of the guide rod abutting member is fixedly attached to the chassis while another end presses upon the rod end of the principal/secondary guide rod. By rotating the adjusting base, an inclination of the principal guide rod or the secondary guide rod is adjusted.

To provide a further understanding of the invention, the following detailed description illustrates embodiments and examples of the invention that are provided for explaining the invention and should not be construed to limit the scope of the invention.

BRIEF DESCRIPTION OF THE DRAWINGS

The drawings included herein provide a further understanding of the invention. A brief introduction of the drawings is as follows.

DETAILED DESCRIPTION OF THE EMBODIMENTS

Figure 1:
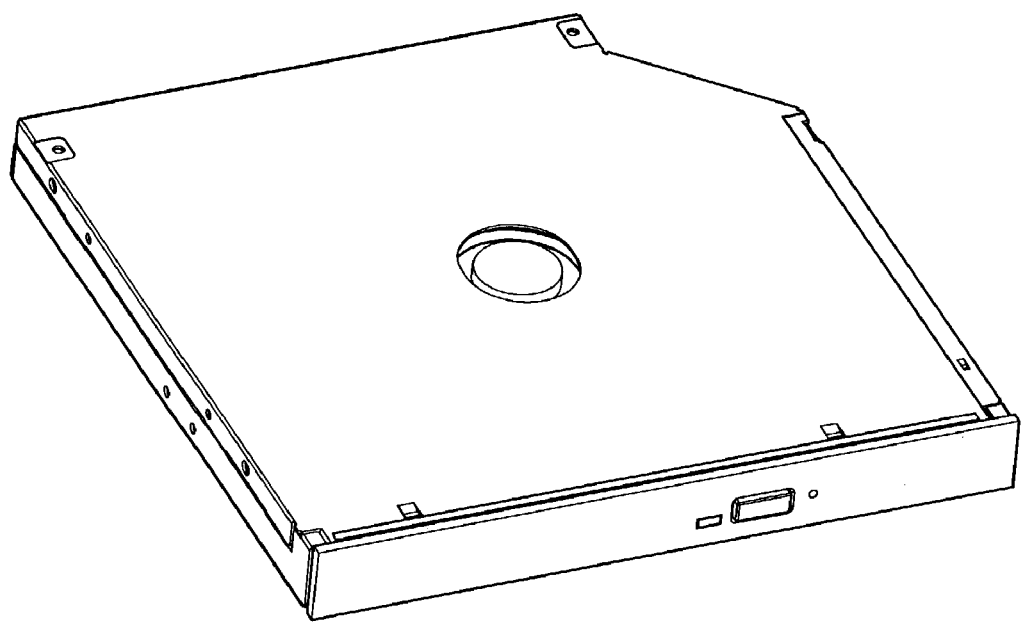
FIG. 1 is a schematic, external perspective view of an optical disc drive known in the art.
Figure 2:
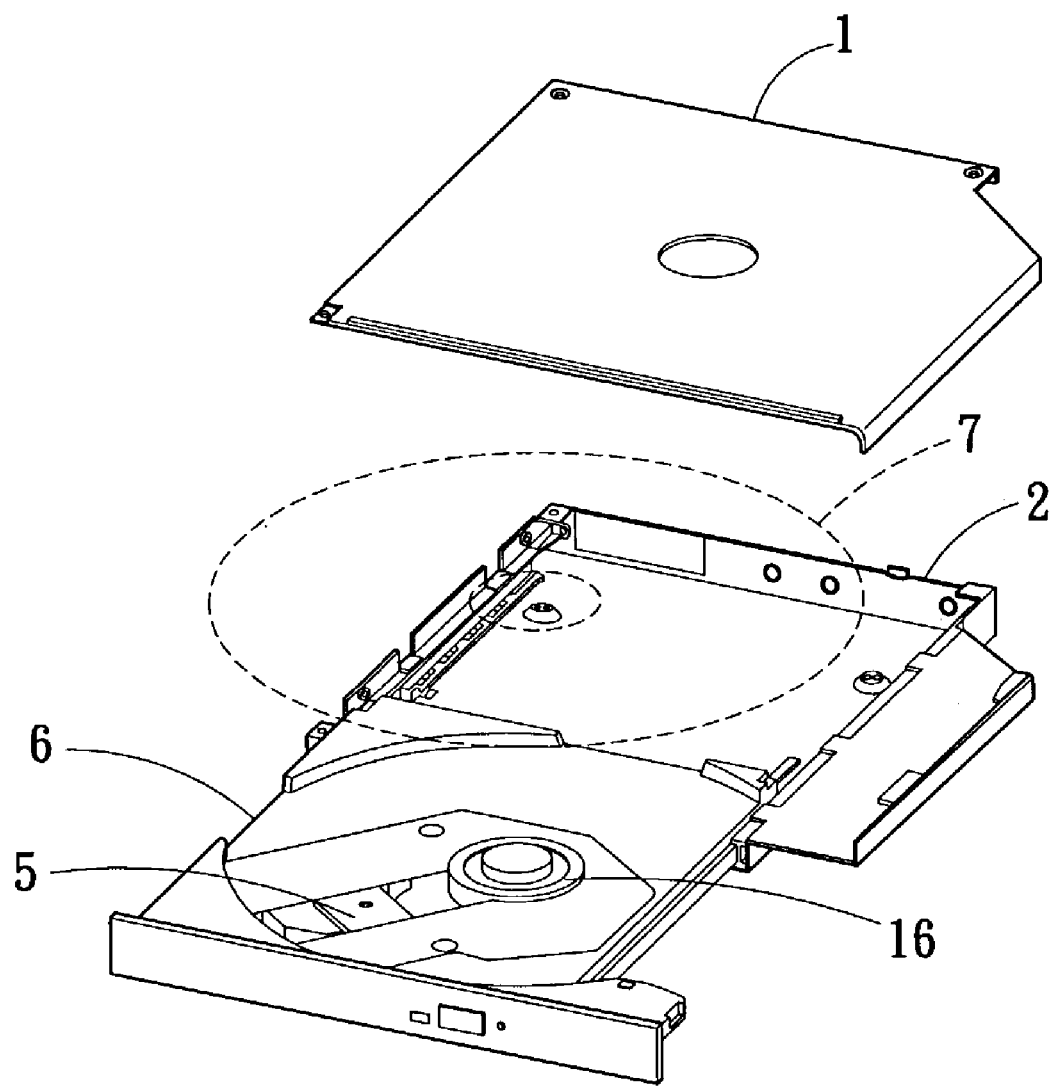
FIG. 2 is a schematic view of the internal part of the known optical disc drive.
Figure 3:
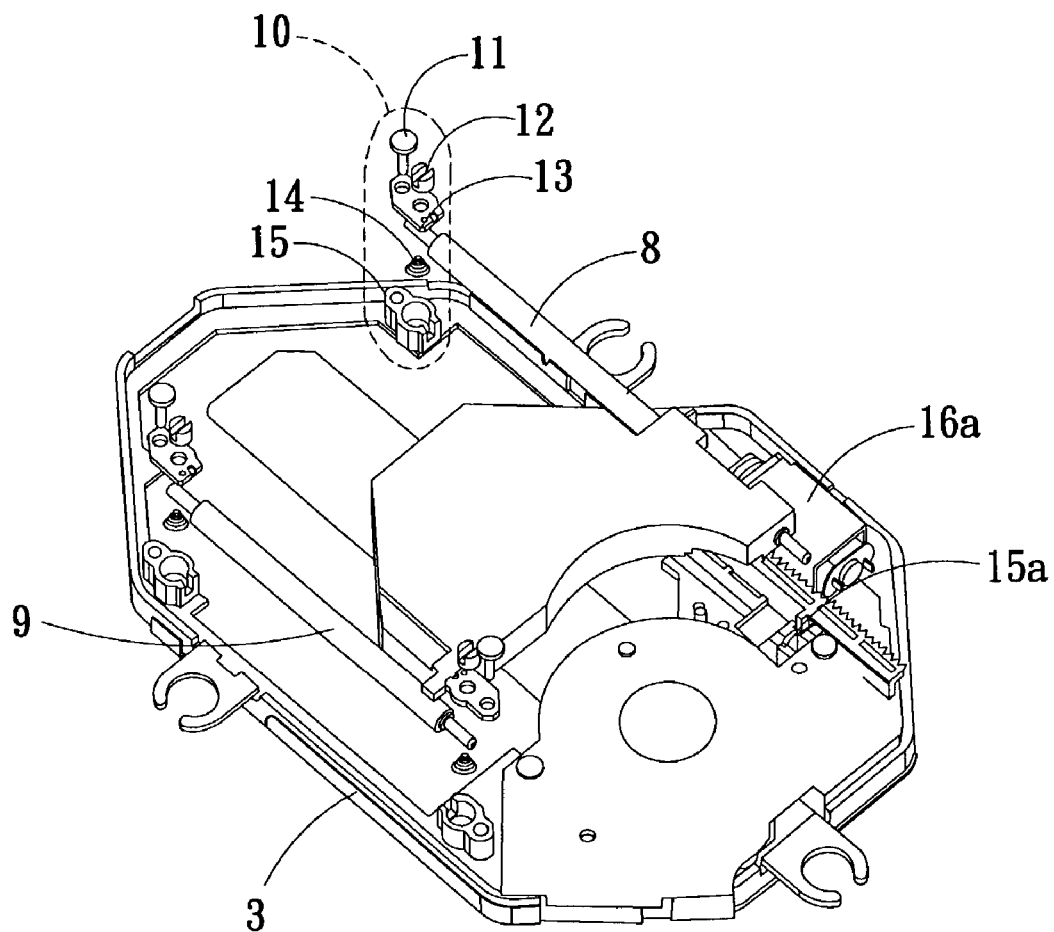
FIG. 3 is a schematic, exploded view of a conventional adjusting mechanism used in an optical disc drive.
Figure 4:
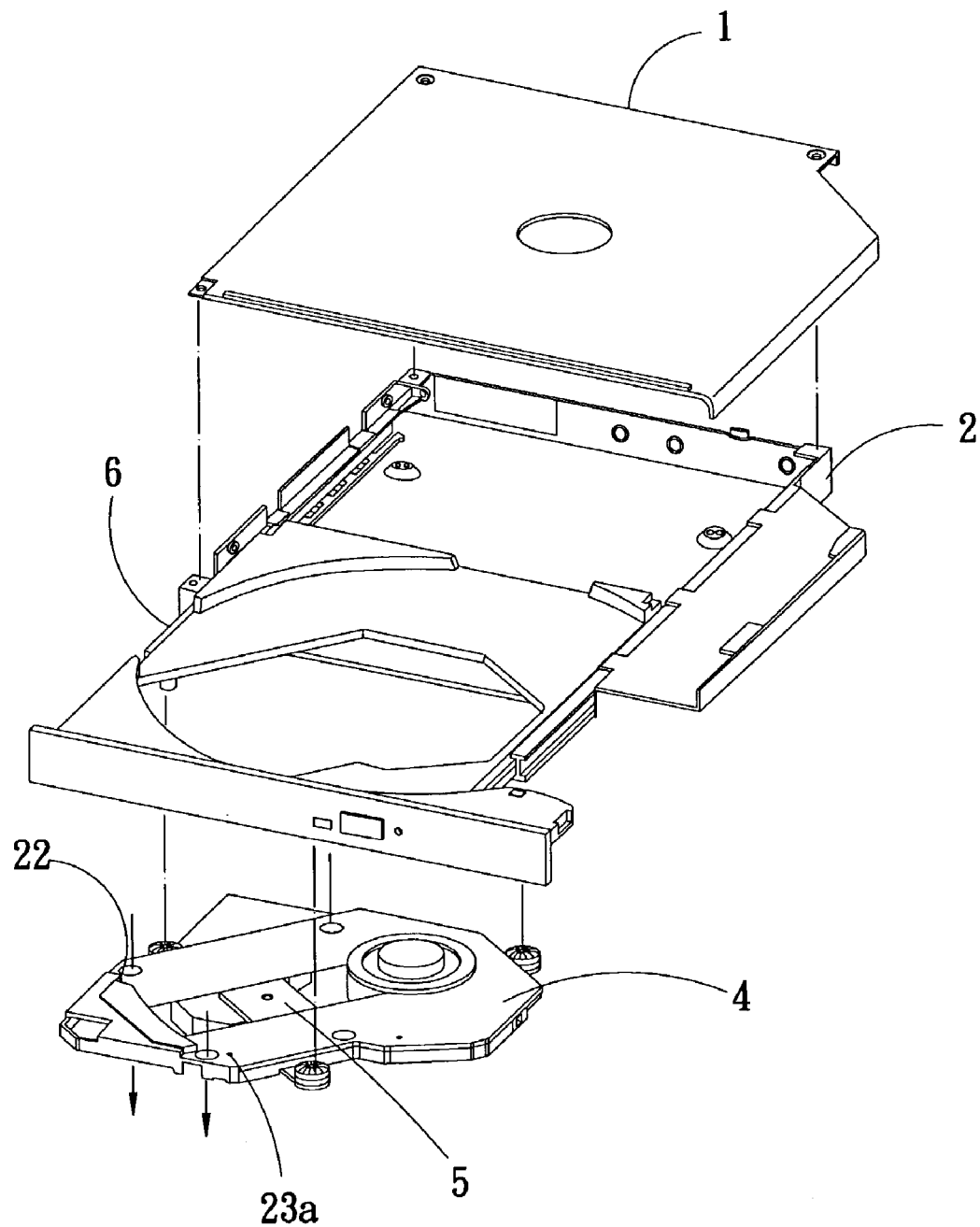
FIG. 4 is a schematic, perspective view of a part of an optical disc drive provided with an optical disc head adjusting mechanism according to an embodiment of the invention.
Figure 5:
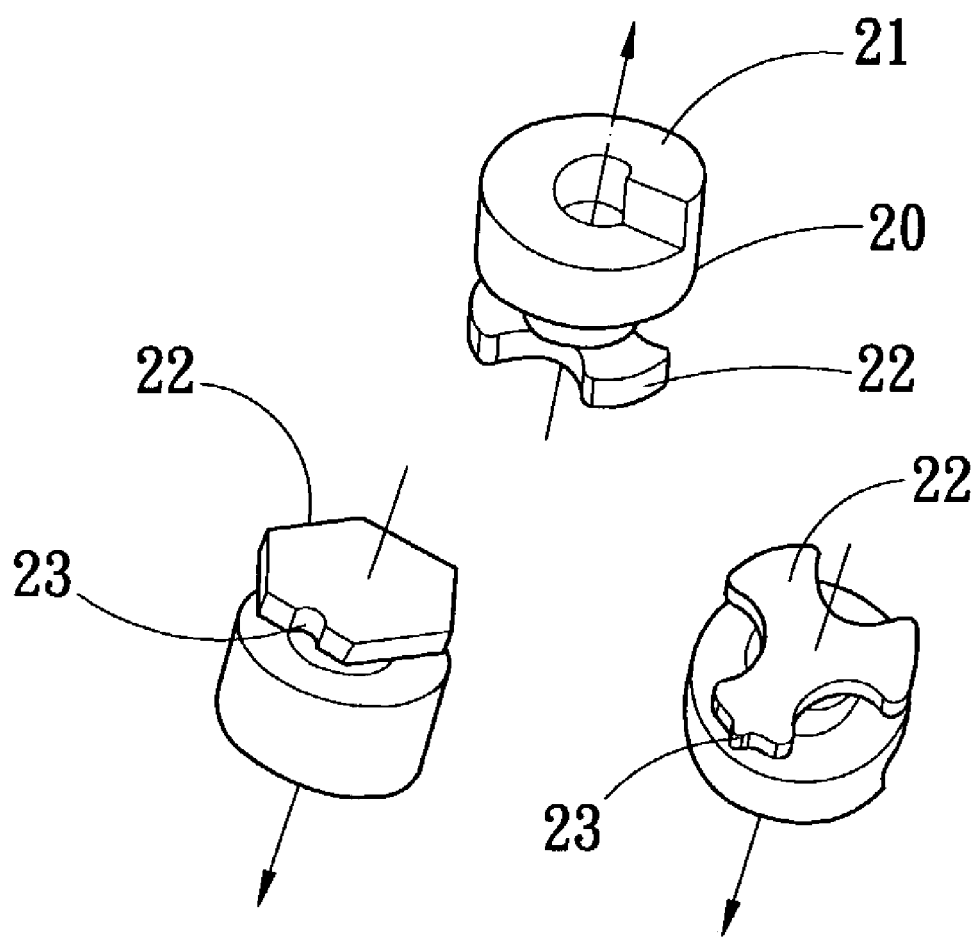
FIG. 5 is a schematic view of a cam-shaped adjusting base used in an optical pickup head adjusting mechanism according to an embodiment of the invention.

Wherever possible in the following description, like reference numerals will refer to like elements and parts unless otherwise illustrated.

Referring to FIG. 4 through FIG. 7, the invention provides an adjusting mechanism for an optical pickup head of an optical disc drive. The optical disc drive internally comprises a chassis 3 that supports an optical pickup head 5 for reading and writing data from an optical disc 7. A principal guide rod 8 and a secondary guide rod 9 are mounted parallel to each other on the chassis 3. The principal guide rod 8 and secondary guide rod 9 respectively lie along a lengthwise direction of the chassis 3. An end of the principal guide rod 8 is attached to a fastening base 15a, being preferably made of plastics. The fastening base 15a is fixedly attached on the chassis 3. The optical pickup head 5 is slidably mounted on the principal guide rod 8 and secondary guide rod 9 along which it is slidably driven by means of a driving motor 16a for performing read/write operations on the disc 7 placed on the spindle motor 16.

Figure 6:
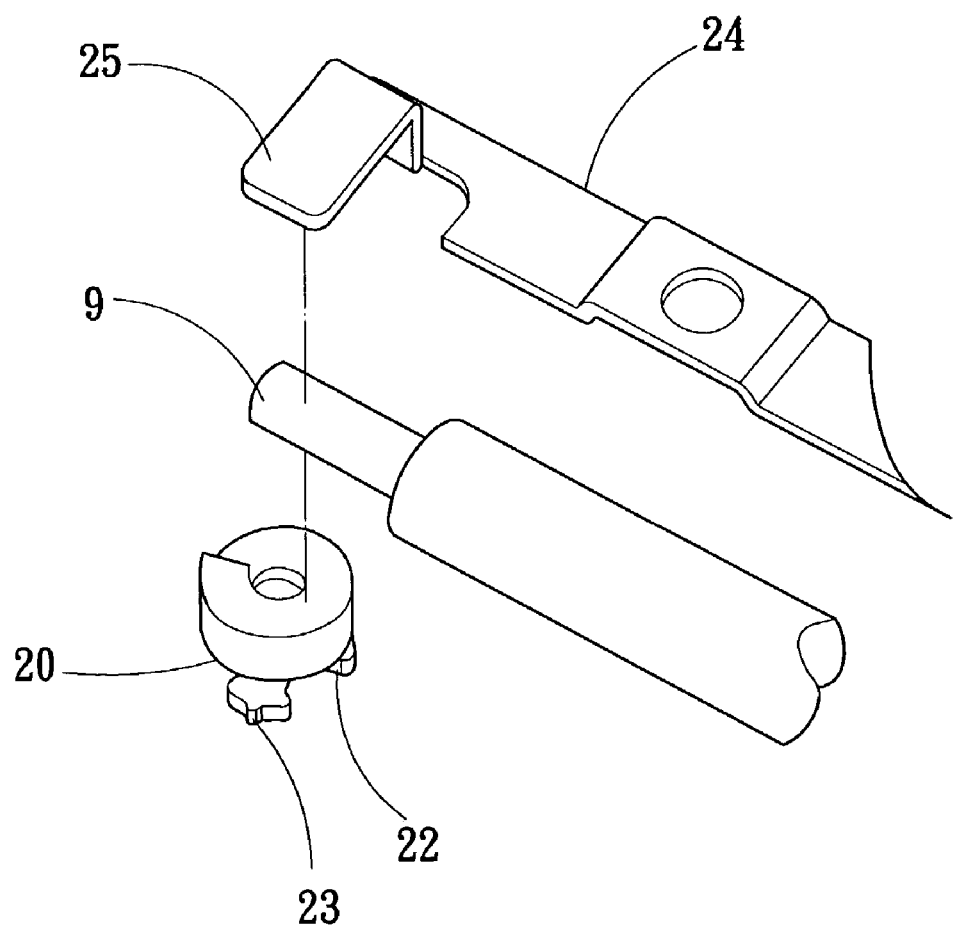
FIG. 6 is a schematic, partial view illustrating the assembly of the adjusting mechanism with a guide rod according to an embodiment of the invention.
Figure 7:
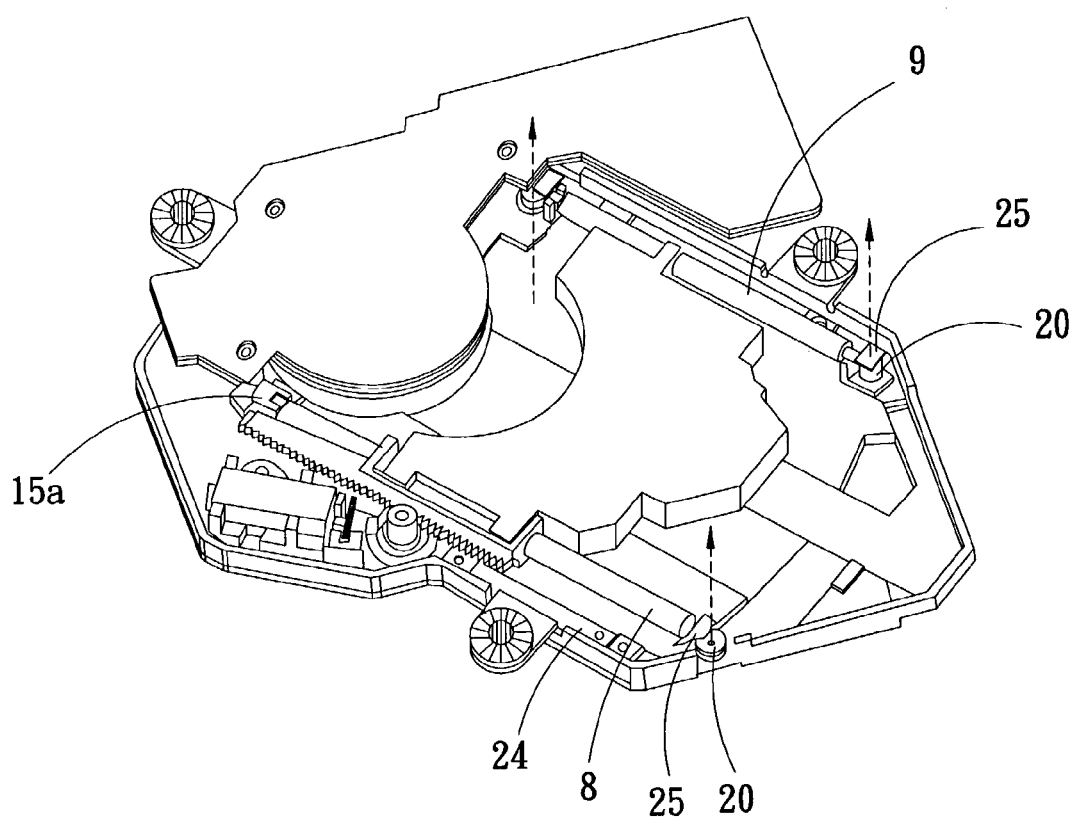
FIG. 7 is a schematic, perspective view of an assembled optical pickup head adjusting mechanism according to an embodiment of the invention.

According to an embodiment of the invention, a cam-shaped adjusting mechanism is respectively assembled with one end of the principal guide rod;8 and two ends of the secondary guide rod 9. As illustrated in FIG. 6, an adjusting mechanism comprises a cam-shaped adjusting base 20 and a guide rod abutting member 24. The cam-shaped adjusting base 20 has a helical and oblique surface 21 below which is provided a rotating part 22. A reference mark 23 is formed at a peripheral portion of the rotating part 22 by plastics injection molding in a manner to be directly connected with the chassis 3. The rotating part 22 is thereby located at another side of the chassis 3. A reference point 23a is provided on the chassis 3 at an adequate location corresponding to the reference mark 23. An end of the guide rod abutting member 24 is fixedly attached on the chassis 3, while another end thereof forms a flexible pressing surface 25, being respectively pressed against one end of the principal guide rod 8 and two ends of the secondary guide rod 9. Each cam-shaped adjusting base 20 is respectively mounted with the surface 21 below in contact with one end of the principal guide rod 8 and two ends of the secondary guide rod 9 to respectively push upward each corresponding rod end.

The rotating part 22 below the helical and oblique surface 21 of each cam-shaped adjusting base 20 is provided with a slit having an adequate shape that is, for example, cruciform, linear, hexagonal, triangular, rectangular, or a rosette. A periphery or a surface of the rotating part 22 is further provided with a protuberance or a recessed reference mark used to adjust the reference mark 23 relative to an initial position. By using a rotating tool manipulated from a lower side of the adjusting base 20, the rotating part 22 is thereby accurately rotated. As described above, the adjusting base 20 is formed by plastics injection molding in a manner to directly connect in a predetermined hole 20a of the chassis 3. The adjusting mechanism is thereby assembled on the chassis 3, and the helical oblique surface 21 of each adjusting base 20 is respectively placed below one end of the principal guide rod 8 and two ends of the secondary guide rod 9. The respective inclination of the principal guide rod 8 and/or secondary guide rod 9 can be adjusted via a rotation of one or more adjusting base 20. The inclination of the optical pickup head 5 can be therefore adjusted to an optimal angle via the three adjusting bases 20 provided by the invention.

As described above; the cam-shaped adjusting bases of the invention therefore allows the adjustment of an optimal inclination of the optical pickup head to ensure an adequate perpendicularity of the optical axis of the optical pickup head relative to the optical disc. By providing a reference mark on the rotating part of each adjusting base, an initial reference can be accurately adjusted, which therefore enables an optimal adjustment of the perpendicularity of the optical axis of the laser beam relative to the optical disc. The failure of the reading operation is thereby favorably reduced, which meets the requirements of the market.

Furthermore, since the adjusting bases of the invention are formed by injection molding in a manner so as to be directly connected to the chassis, the conventional adjusting structure with adjusting screws, attachment base, and fixing screw and spring no longer are needed. The assembly process, as well as the production cost, is therefore reduced since the number of elements of the adjusting structure is reduced in the invention.

Those skilled in the art will readily appreciate that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. An adjusting mechanism for an optical disc drive, mounted to at least a rod end of a principal guide rod or a secondary guide rod respectively provided in the optical disc drive, the adjusting mechanism comprising:
   a guide rod abutting member having a first end fixedly attached on a chassis of the optical disc drive, and a second end forming a flexible pressing surface above the rod end; and
   a cam-shaped adjusting base fixedly mounted on the chassis below the rod end, the adjusting base having a helical and oblique surface and a rotating part positioned at an opposite side of the adjusting base from the helical and oblique surface, the rotating formed for receiving an adjusting tool for rotating the adjusting base;
wherein the helical and oblique surface is placed below in contact with the rod end;
   wherein the rotating part has a reference mark fonned at a peripheral portion thereof for adjusting the adjusting base with the adjusting tool until the reference mark correspond to a reference point formed on the chassis;
   whereby an inclination of the principal guide rod or the secondary guide rod is adjusted by rotating the adjusting base.

2. The mechanism of claim 1, wherein the adjusting base is directly connected to a predetermined hole of the chassis.

3. The mechanism of claim 1, wherein the rotating part is provided with a slit having a cruciform, linear, hexagonal, or rectangular shape.

4. The mechanism of claim 1, wherein the rotating part is formed in a hexagonal, triangular, rectangular, or a rosette shape.

5. The mechanism of claim 1, wherein one adjusting mechanism is respectively mounted at an end of the principal guide rod and an end of the secondary guide rod.

6. The mechanism of claim 1, wherein one adjusting mechanism is respectively mounted at an end of the principal guide rod and two ends of the secondary guide rod.

* * * * *